2,863,301

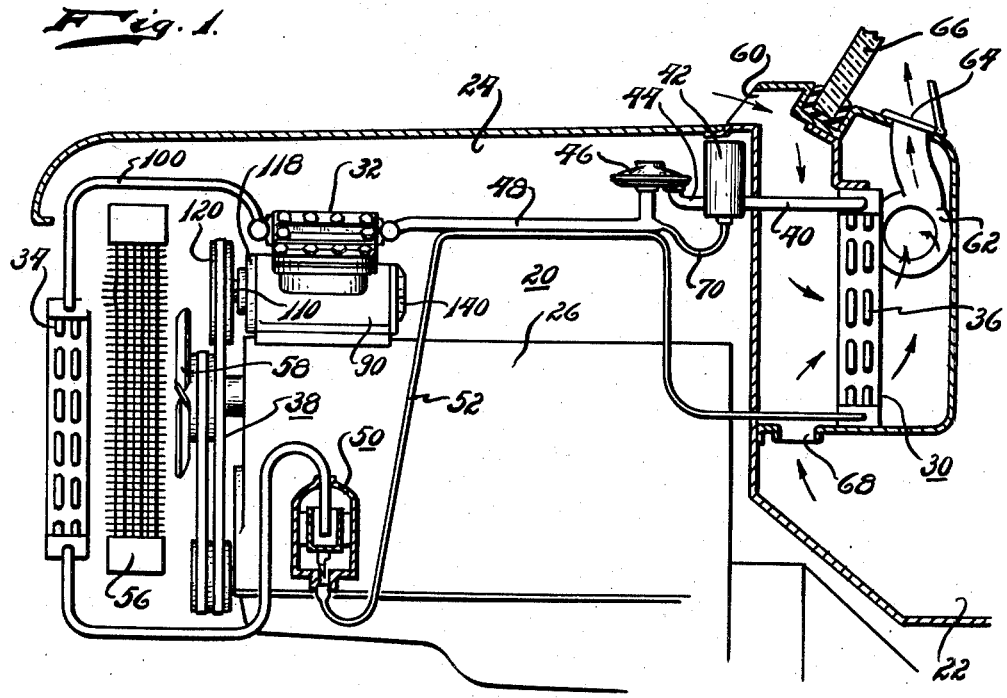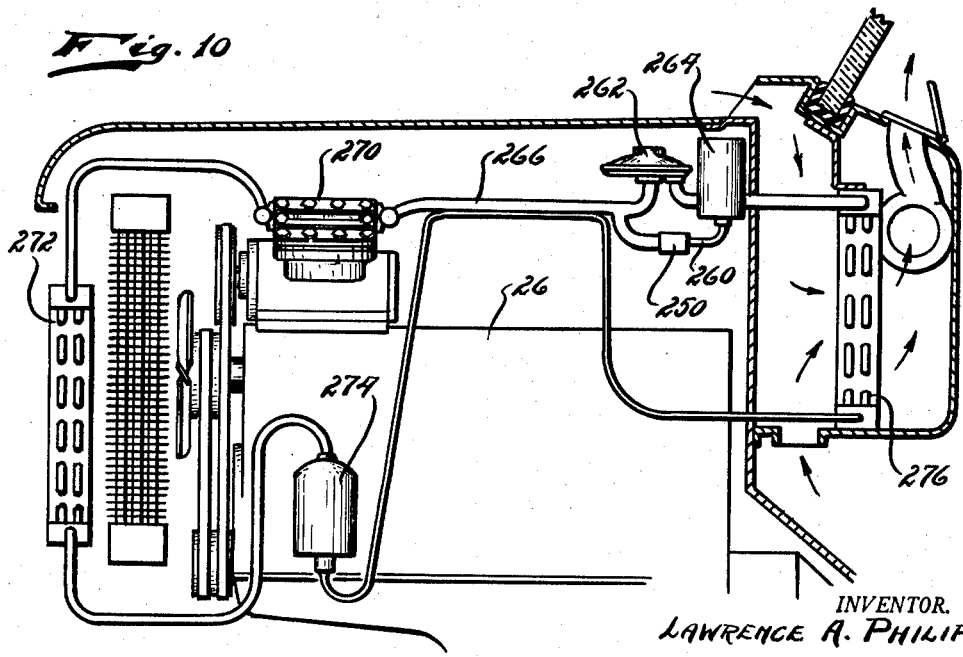

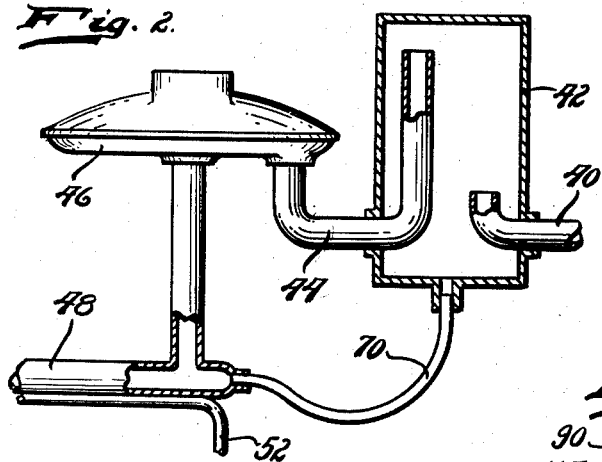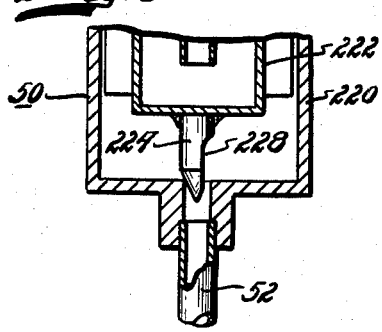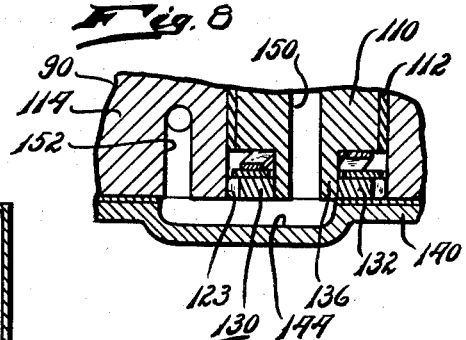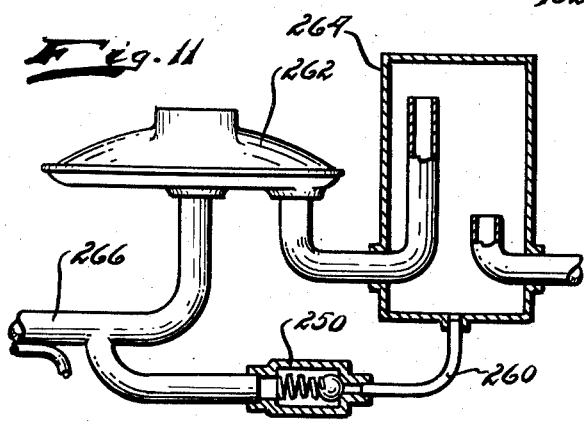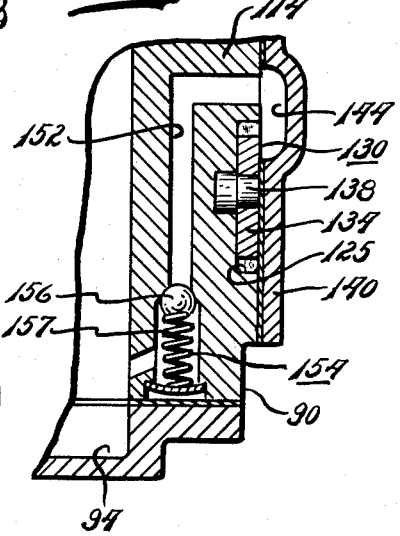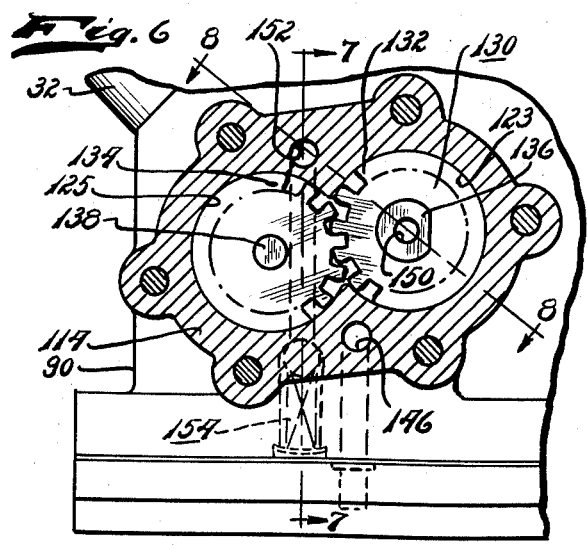
INVENTOR.
LAWRENCE A. PHILIPP
BY
Ralph E. Baker
ATTORNEY Dec. 9, 1958 L. A. PHILIPP 2,863,301
LUBRICANT CIRCULATION IN REFRIGERATING APPARATUS
Filed March 2, 1956 3 Sheets-Sheet 3
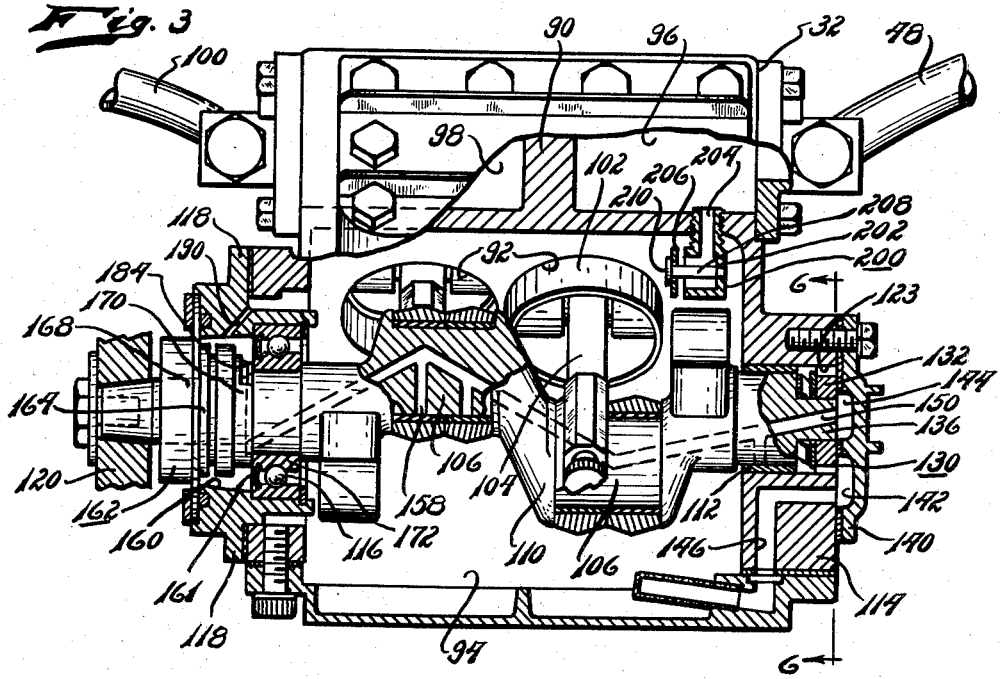
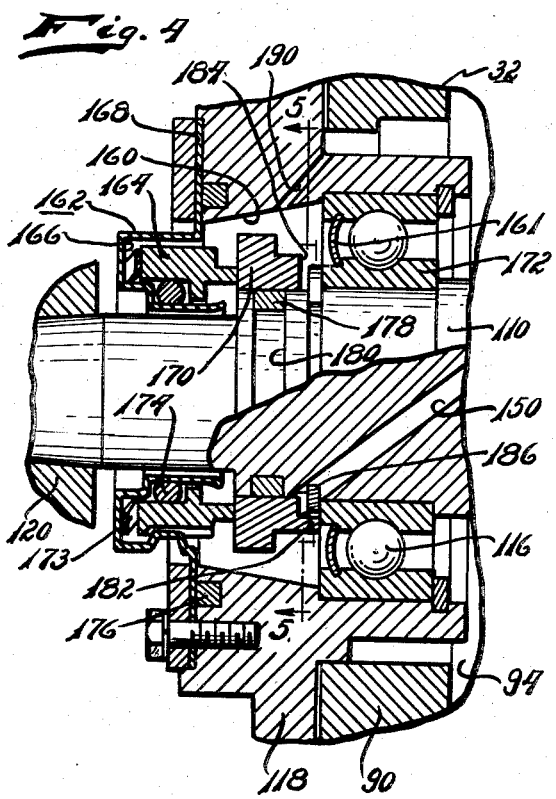
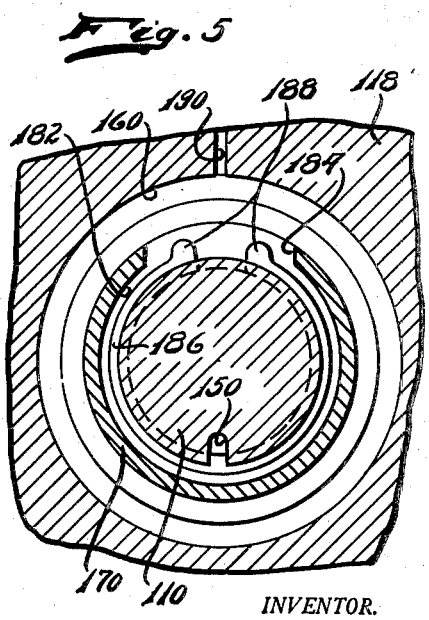
INVENTOR.
LAWRENCE A. PHILIPP
BY
Ralph E. Baker
ATTORNEY

LUBRICANT CIRCULATION IN REFRIGERATING APPARATUS

Lawrence A. Philipp, Detroit, Mich., assignor to American Motors Corporation, Detroit, Mich., a corporation of Maryland Application March 2, 1956, Serial No. 569,067

7 Claims. (Cl. 62—193)

This invention relates to refrigerating apparatus and more particularly to such apparatus which is utilized for the conditioning of air for the passenger compartment of automotive vehicles.

In the conditioning of air for the passenger compartment of automotive vehicles it has been the practice to operate a refrigerant compressor of a refrigerating system by connecting the compressor to the vehicle engine. This arrangement is satisfactory provided the pressure on the lubricant in the compressor crankcase remains above atmospheric pressure. In the event the pressure on the lubricant is not maintained above atmospheric such lubricant foams considerably upon initiation of compressor operation which results in destruction of the compressor valves and the removal of such lubricant from the compressor crankcase where it is needed to lubricate the moving parts thereof. Furthermore, such compressors are of the so-called open type wherein the crankshaft thereof extends through a wall of the compressor crankcase so that the same may be driven by a pulley and belt arrangement connected to the engine of the vehicle. Such shafts are sealed by shaft seals to prevent the leakage of lubricant from the compressor crankcase and to prevent the infiltration of air into the refrigerating system. By maintaining the pressure on the lubricant above atmospheric pressure there is insured an effective seal so that there is no infiltration of air into the system and the lubricant does not foam to an appreciable extent upon initiation of compressor operation.

An object of my invention is to provide an improved arrangement for the continuous operation of a refrigerant compressor of a refrigerating system.

It is another object of my invention to maintain in an improved manner the pressure in a crankcase of a refrigerant compressor above atmospheric pressure so as to minimize the foaming of lubricant upon initiating operation thereof and to insure an effective seal above the compressor crankshaft at the place it extends through the crankcase housing.

It is another object of my invention to deliver the lubricant under pressure at above atmospheric pressure to moving parts of the compressor and about the shaft seal and to maintain the pressure above atmospheric around the shaft seal.

Another object of my invention is to provide an accumulator or tank between the outlet of an evaporator and a control valve which regulates the return flow of refrigerant gases from evaporator to compressor and a by-pass arrangement around the control valve arranged whereby when the valve is opened for passage of refrigerant gases therethrough liquid refrigerant and part of the lubricant will be entrapped in the accumulator until the valve closes whereupon the trapped liquid refrigerant and lubricant will flow through the by-pass to a chamber within the compressor for separation, the lubricant returning to the crankcase.

Another object of my invention is to provide an arrangement for the separation of the lubricant from the refrigerant that has passed into the refrigerating system and to return the lubricant to the crankcase.

Another object of my invention is to provide an improved refrigerating system having the refrigerant compressor directly coupled to be driven during the operation of a motor vehicle so that when the refrigerant compressor is stopped due to either a failure in operation or a deliberate stopping of the engine, the refrigerant pressure within the system will rapidly and almost instantly be balanced, that is, equalized between the suction and discharge sides of the compressor thereby unloading the compressor to permit an easier and readier restart of the engine.

Further objects and advantages of the present invention will be apparent from the following description, reference being had to the accompanying drawings, wherein a preferred form of the present invention is clearly shown.

Fig. 1 is a diagrammatic illustration of a refrigerating system and automotive vehicle embodying features of my invention;

Fig. 2 is an enlarged diagrammatic illustration of a control device embodying features of my invention;

Fig. 3 is an enlarged sectional view of a refrigerant compressor embodying features of my invention;

Fig. 4 is a fragmentary enlarged view in cross section of the compressor and shaft seal embodying features of my invention;

Fig. 5 is a fragmentary view in cross section taken along line 5—5 of Fig. 4;

Fig. 6 is an enlarged view in cross section taken along line 6—6 of Fig. 3;

Fig. 7 is a fragmentary view in cross section taken along line 7—7 of Fig. 6;

Fig. 8 is a fragmentary view in cross section taken along line 8—8 of Fig. 6;

Fig. 9 is an enlarged view of a float valve embodying features of my invention;

Fig. 10 is a diagrammatic illustration of a refrigerating system and automotive vehicle embodying modified forms of my invention; and Fig. 11 is an enlarged diagrammatic illustration of a modified form of control device illustrated in Fig. 10.

In accordance with my invention, I provide a refrigerating system for the conditioning of air for the passenger compartments of motor vehicles. In this system the compressor is driven by the engine of the vehicle and is arranged to be in continuous operation with the operation of the engine to thus eliminate the use of clutches. In order to prevent the possibility of reducing the pressure on the lubricant in the crankcase of the compressor below atmospheric pressure I have arranged a pump to force circulate the lubricant and maintain it under constant pressure at above atmospheric pressure. This minimizes foaming of the lubricant and insures an effective seal about the crankshaft of the compressor. I have found that a minimum pressure of 15 pounds per square inch on the lubricant is satisfactory for this purpose.

Referring to the drawings, the numeral 20 designates in general a motor vehicle having a passenger compartment 22 and an engine compartment 24. Within the engine compartment 24 is a variable speed engine 26.

A refrigerating system 30 is positioned within the vehicle 20 and is used for cooling the air entering the passenger compartment 22. The system includes in general, a compressor 32, a condenser 34 and a refrigerant evaporator 36. The compressor is driven at variable speeds by the engine 26 during the operation of the engine through a pulley-belt arrangement designated in general by the numeral 38.

Positioned at the outlet of refrigerant evaporator 36 and connected therewith by conduit 40 is a tank or accumulator 42 that is connected by conduit 44 to a pressure regulating control valve 46. The control valve 46 is connected to a suction or inlet side of the compressor by refrigerant return conduit 48.

During operation of the engine 26 evaporated refrigerant is conducted from the evaporator 36 into the tank or accumulator 42 from which it is withdrawn under the control of the pressure regulating valve 46 by the compressor 32 which compresses same and delivers it to the condenser 34 wherein it is liquified, and from which it is delivered to the evaporator under the control of a high side float 50 and a small diameter conduit 52. The conduit 52 is bonded to the refrigerant return conduit 48 to cool the liquid in the conduit 52 to prevent formation of vapor in the conduit and to insure that only liquid will enter the evaporator 36. The conduit 52 is of a small diameter to keep the pressure up so that expansion will not take place at the outlet of high side float 50. Under these conditions the expansion of refrigerant takes place at the inlet of the evaporator 36. The system 30 has a low pressure side from the inlet of the evaporator to the inlet of the compressor including the crankcase thereof and a high pressure side from the outlet of the compressor to the inlet of the evaporator 36.

Positioned between the engine 26 and condenser 34 is a radiator 56 of the vehicle. The incoming air cools the condenser 34 and radiator 56 when the vehicle is in motion and a fan 58 driven by the engine 26 causes movement of air over the condenser and radiator during operation of the engine to dissipate heat from the condenser and the radiator.

During forward movement of the vehicle fresh air enters the vehicle by ram pressure and in this instance it enters through the cowl ventilator 60 whence it passes over the evaporator aided by the action of a fan 62. The cooled air enters the passenger compartment 22 from an outlet opening 64 adjacent the windshield 66 of the vehicle. This conditioned air is circulated throughout the compartment 22 and, assisted by the action of the fan 62, returns through an opening 68 to again flow over the evaporator 36 for further conditioning. The opening 68 may be controlled by a damper (not shown) to regulate the amount of recirculated air that may mix with incoming fresh air.

The pressure regulating valve 46 may be of any of the well known types responsive to changes in pressures within the evaporator to throttle the outlet or flow of refrigerant therefrom to keep the pressure sufficiently high during conditions of operation. This is desirable to prevent the evaporator from operating at excessively low temperatures which may cause excess condensation of moisture from the air to freeze out upon the surface of the evaporator and therefore it is more desirable that the evaporator be operated at temperatures about 32° F. The refrigerant pressures in the tank or accumulator 42 and the evaporator 36 are equal. The conduit 44 extends upwardly toward the top of the tank to allow gaseous refrigerant to enter and pass therethrough to the valve 46. Any liquid refrigerant and lubricant, not entrained in the gaseous refrigerant, will remain to accumulate in the tank 42 until the valve 46 closes whereupon it will pass outwardly to return to the compressor through a small diameter conduit 70. The conduit 70 interconnects the outlet at the bottom of tank 42 with the refrigerant return conduit 48 to provide a by-pass around the valve 46.

The compressor 32 comprises a casting 90 in which are formed cylinders 92, a crankcase 94, an inlet or suction chamber 96 and an outlet or discharge chamber 98. The refrigerant return conduit 48 is connected to return refrigerant to inlet chamber 96 and a refrigerant conduit 100 is connected to conduct compressed refrigerant from the outlet chamber 98 to the condenser 34. The chambers 96 and 98 are in communication through suitable valves (not shown) with the cylinders 92 within which are reciprocated pistons 102 connected by connecting rods 104 to crank arms 106 of a crankshaft 110. The crankshaft 110 is journaled in a bearing 112 supported in an end wall 114 of the crankcase, and is also journaled in a ball type bearing 116 supported in a removable end plate 118 that forms a closure for the opening in the end wall of the crankcase 94. The crankshaft 110 extends through an opening in the end wall plate 118 for securement thereon of a pulley sheeve 120 that is operatively connected with the belt pulley drive 38 to be driven by the engine 26.

A lubricant pump 130 is operatively driven by the crankshaft 110. The lubricant pump 130 comprises two intermeshing planetary gears 132 and 134 rotating in cylinders 123 and 125, respectively, provided in the end wall 114. The gear 132 is secured on a reduced end 136 of the crankshaft for rotation therewith to mesh and drive the idler gear 134 journaled on a stud 138 extending from and secured in the end wall 114. A cover plate 140 extends over the gears 132 and 134 as a closure for cylinders 123 and 125, and formed in the cover plate are recesses forming an inlet port 142 and an outlet port 144. The inlet port 142 communicates through a passageway 146 with the lower portion of the crankcase for withdrawing lubricant from the crankcase to the pump. The outlet port 144 is extended to communicate with a passageway 150 bored centrally through the crankshaft 110 and with a by-pass passageway 152 formed through end wall 114 to communicate with the interior of the crankcase. Positioned within the by-pass passageway 152 is a pressure relief valve 154 which comprises a ball 156 and spring 157 adapted to maintain the passageway closed except during periods when the pressure exceeds a predetermined high value whereupon the ball 156 will unseat to permit by-passing of the lubricant from the outlet of the pump back to the crankcase thereby insuring that the lubricant will flow at a constant uniform pressure through the crankshaft passageway 150.

Drilled in the crankshaft are a plurality of passages 158 extending radially from the passageway 150 to distribute lubricant therefrom to various bearings and towards the piston connection. The passageway 150 is extended through the crankshaft to deliver lubricant to a chamber 160 within which is a shaft seal assembly 162.

The shaft seal assembly 162 comprises a non-rotating sealing ring 164 movably supported in an annular recess 166 formed in a plate 168. The plate 168 is secured over the opening in the end plate 118 to close the open end of the chamber 160 around the crankshaft extending therethrough. One end face of the sealing ring 164 is ground to abut against a ground face of a rotating collar 170 whose opposite face abuts against a race 172 of the ball bearing 116. The sealing ring 164 is axially moved to press against the collar 170 by a thrust spring member 173 to provide an engagement that will form a tight seal to prevent leakage of lubricant, refrigerant vapors or air therethrough.

To further prevent leakage of fluid between atmosphere and chamber 160 sealing rings 174, 176 and 178 formed of compressible materials are provided. The sealing ring 174 is positioned to be compressed between a wall of an annular recess 166 and the body of the sealing ring 164. The sealing ring 176 serves as a sealing gasket between the plate 168 and the end wall plate 118. The sealing ring 178 is set in groove 180 formed in the crankshaft to be compressed by the collar 170 secured thereover.

The collar 170 is formed with an annular recess 182 to receive the lubricant as it flows from passage 150 and deliver it through a slotted opening 184 into the chamber 160. A snap ring 186 is secured on the crankshaft having ears 188 that extend into the opening 184 to engage the sides thereof and lock the collar for rotation with the crankshaft. The lubricant will flow to completely fill the chamber 160 to provide a fluid seal about the shaft seal 162 to prevent atmospherical leakage into the compressor and overflows through an overflow outlet passage 190 that communicates from the upper portion of the chamber 160 with the crankcase. The outlet passage 190 is preferably of smaller cross sectional diameter than the diameter of passageway 150 and is so arranged that a desired constant minimum pressure on the lubricant will be maintained within the chamber 160 as the flow resistance through the outlet passage 190 is greater than through the crankshaft passage into the chamber 160. It has been found that a 15 pound per square inch pressure on the lubricant is satisfactory for normal operation of the compressor. However, should the pressure exceed a predetermined maximum desired, the relief valve 154 will open to permit part of the pumps output to be directly by-passed through passage 152 into the crankcase. A sealing ring 161 is provided in bearing 116 to prevent leakage therethrough between the chamber 160 and crankcase.

The inlet or suction chamber 96 is in controlled communication with the crankcase 94 by means of a return check and relief valve 200. The valve 200 includes a body 202 having a central passage 204 extending therethrough and over the opening of which, on the crankcase side, is adapted to seat an annular ring 206. The ring 206 is mounted on a pin 208 and is axially movable thereon toward the opening of the passage 204 and is limited in its movement away from the opening by a head 210 formed on the pin 208. The annular ring fits loosely on the pin to permit a leakage around the pin into the passage 204 when the ring seats over the opening of the passageway. Oil separated from the refrigerant and deposited in the suction chamber 96 will return to the crankcase through the valve 200. The valve is a safeguard against withdrawal of slugs of lubricant from the crankcase during the initial start of the compressor when there is a sudden reduction of crankcase pressure. When the annular ring 206 seats over the opening of passage 204 its loose fit on the pin 208 permits a metered flow of gaseous refrigerant to flow from the crankcase into the chamber 96.

When the engine 26 is in operation and it is desired to condition the air for the compartment 22 the fan 62 is placed in operation so that the air entering the cowl ventilator 60 is caused to flow over the surface of the evaporator 36 to be cooled thereby. The fan may be manually started or it may be an automatic thermostatically controlled type. When the air passes over the surface of the evaporator the refrigerant absorbs the heat from the air which causes the refrigerant to vaporize. The vaporized refrigerant passes from the evaporator into the tank or accumlator 42 where it is withdrawn by the compressor under the control of the pressure regulating valve 46 which is responsive to changes in pressures in the evaporator.

During periods when air conditioning is desirable, and when the fan 62 is operating, there will be sufficient vaporization taking place in the evaporator resulting in sufficient pressure therein to operate the valve 46 to open position for gaseous refrigerant to flow to the suction chamber 96 and crankcase to maintain an equal pressure in the crankcase. When the valve 46 completely closes because the pressure in the evaporator is below a certain value and as no gaseous refrigerant returns to the suction chamber 96 through conduit 48 there results a reduction of pressure in the crankcase as the gaseous refrigerant therein is withdrawn from the crankcase through the check valve 200. However, excessive reduction in crankcase pressure is prevented by the operation of the lubricant pump, and by the withdrawal of accumulated liquid refrigerant and lubricant from the tank 42 through the small diameter by-pass conduit 70, into the return conduit 48 and into the suction chamber 96. As long as the valve remains closed a continuous metered flow of refrigerant and such lubricant as has passed into the system will be withdrawn from the evaporator and tank into the compressor. The unvaporized refrigerant that is drawn into the suction chamber will be vaporized therein by the heat of the compressor before being compressed by the compressor. The lubricant will separate from the refrigerant to return through valve 200 to the crankcase. The lubricant in the crankcase is circulated under pressure at a minimum of 15 pounds per square inch above crankcase pressure and as the seal will be surrounded by fluids of this pressure the seal will be under pressure above atmospheric pressure even during no refrigeration periods when there occurs a reduction in crankcase pressure. Thus atmospheric leakage through the seal is prevented.

The arrangement of the small diameter conduit 70 permits a metered flow of refrigerant to allow a continuous operation of the compressor without reducing the pressure in the evaporator to permit vaporization of the refrigerant and the cooling of the air passing thereover. This metered flow of refrigerant to the compressor will prevent excess drop in crankcase pressure which would occur if no refrigerant could return to the compressor and this flow together with the operation of the lubricant pump 130 insures that the pressure in the crankcase and about the seal is maintained at above atmospheric pressure particularly during periods when no refrigeration is desired. The crankcase pressure is always retained above a certain value even though vaporization is not taking place in the evaporator. When the compressor is not operating, the pressure on the high and low pressure sides of the system equalizes to thereby insure that the pressure in the compressor, including the crankcase is maintained above the aforesaid certain value.

To provide for the balancing of pressures, or an unloading of the compressor when it is stopped, the high side float 50 is provided with a cracked or partially opened valve. The high side float 50 includes a casing 220 that houses a float bucket 222 which carries a valve proper 224 of the needle valve type. The valve 224 is machined or flattened on one side, as at 228, to provide a so-called cracked valve to provide an arrangement for unloading the compressor when it is stopped for any reason. During operation liquid refrigerant enters bucket 222 and overflows causing the bucket to rise as the level of liquid rises in the casing 220 to lift the valve 224 from its seat to meter the flow of liquid refrigerant to the evaporator in the usual manner. When the compressor stops the valve 224 due to cut away portion 228 permits the pressure on the high and low pressure sides of the system to equalize since refrigerant vapors are free to pass through the cracked valve. The unloading takes place in a matter of seconds and permits an easier start of the engine 26.

In Figs. 10 and 11, I have shown a modified form of my invention wherein a pressure regulating valve 250 is interposed in the small diameter conduit 260 providing a by-pass around the pressure regulating valve 262 from the tank 264 to the refrigerant return conduit 266. The construction and operation of the compressor 270, with a lubricant pump, is similar to the compressor 32 described and illustrated above. The refrigeration system is otherwise similar to that described in the preferred form having a condenser 272, high side float 274 and an evaporator 276. In operation when refrigeration is desired gaseous refrigerant is withdrawn from evaporator and tank to the compressor under control of the pressure regulating valve 262. When no refrigeration is required and the valve 262 closes there results a drop in pressure in the return conduit 266 to effect an opening of the by-pass valve 250 to permit a metered flow of refrigerant through the small diameter conduit 260 to the compressor. When refrigeration is again desired and the valve 262 opens the increase in pressure in the return conduit will cause the by-pass valve 250 to close. Thus there is provided a means for positively closing the by-pass against flow therethrough and provides an arrangement for alternately opening and closing the parallel passages.

From the foregoing it will be apparent that there has been described and illustrated a refrigerating system whereby the compressor may be continuous in operation in a satisfactory manner. Furthermore, the arrangement is such as to reduce to a minimum any loss of lubricant from the crankcase by maintaining adequate pressures therein to reduce to a minimum any pumping out action particularly during periods when little or no refrigeration is required. The arrangement is such that any lubricant in the system could be collected and returned to the compressor particularly during periods when little or no refrigeration is required. Also the arrangement prevents excess lubricant or liquid refrigerant from passing to the pressure control valve and causing injury thereto as such lubricant and refrigerant is trapped and caused to flow through the by-pass to the compressor upon the closing of the pressure regulating valve. By the arrangement of the float valve the pressures in the high and low pressure sides of the system may be quickly equalized upon the halting or stopping of the compressor to permit a free turning compressor during the initial starting period. However, the float valve arrangement does not interfere with normal refrigeration.

Although preferred and modified forms have been illustrated and described in detail, it will be apparent to those skilled in the art that various other modifications may be made therein without departing from the spirit of the invention or from the scope of the appended claims.

I claim:

1. A refrigerating system having a low pressure side and a high pressure side, said system including a refrigerant compressor for withdrawing low pressure refrigerant from said low pressure side, a valve for controlling said withdrawal, a chamber for lubricant within said refrigerant compressor, said chamber being in communication with said low pressure side and having means for restricting communication therebetween when the pressure in said chamber is greater than in said low pressure side, a pump means for circulating said lubricant under pressure, a by-pass means around said valve arranged for restricted withdrawal of refrigerant by said refrigerant compressor when said valve is closed to maintain with said pump means a pressure in said chamber at above atmospheric pressure.

2. A refrigerating system having a low pressure side and a high pressure side, said system including a refrigerant compressor for withdrawing low pressure refrigerant from said low pressure side, a valve for controlling said withdrawal, a chamber for lubricant within said refrigerant compressor, said chamber being in communication with said low pressure side and having means for restricting communication therebetween when the pressure in said chamber is greater than in said low pressure side, a pump means for circulating said lubricant under pressure, a by-pass means around said valve arranged for restricted withdrawal of refrigerant by said refrigerant compressor, a valve in said by-pass means operable to close when said first mentioned valve means is opened and alternately open when said first mentioned valve is closed, and said by-pass being arranged with said valve for restricted withdrawal of refrigerant by said compressor to maintain with said pump a pressure in said chamber at above atmospheric pressure.

3. Refrigerating apparatus comprising a condenser, an evaporator and a continuous operating compressor having a crankcase with an opening through a wall of said crankcase, a crankshaft journaled in said crankcase and extending through said opening, a sealing means for closing said opening about said shaft, means including a pump for forcing lubricant under pressure towards said sealing means and retarding the flow from said sealing means to surround the sealing means with lubricant under pressure, a conduit interconnecting said evaporator and compressor, pressure regulating means for controlling the flow of refrigerant through said conduit to said compressor for compressing the refrigerant for conduction to said condenser, a small diameter conduit interconnecting said evaporator and compressor providing a reduced flow of refrigerant to said compressor upon the closing of said first mentioned conduit to refrigerant flow by said pressure regulating valve, and a controlled communicating means for conducting a portion of the refrigerant to said crankcase from said first and second mentioned conduits.

4. Refrigerating apparatus comprising a condenser, an evaporator and a continuous operating compressor having a crankcase with an opening through a wall of said crankcase, a crankshaft journaled in said crankcase and extending through said opening, a sealing means for closing said opening about said shaft, means including a pump for forcing lubricant under pressure to said sealing means and retarding the flow from said sealing means to surround the sealing means with lubricant under pressure, a conduit interconnecting said evaporator and compressor, pressure regulating means for controlling the withdrawal of refrigerant through said conduit by said compressor for compressing the refrigerant for delivery to said condenser, a by-pass arrangement around said pressure regulating means for withdrawing refrigerant from said evaporator by said compressor without appreciably reducing the pressure in said evaporator during periods said pressure regulating means is closed, and valve means for admitting a portion of the returning refrigerant into said crankcase.

5. Refrigerating apparatus comprising a condenser, an evaporator and a continuous operating compressor having a crankcase with an opening through a wall of said crankcase, a crankshaft journaled in said crankcase and extending through said opening, a sealing means for closing said opening about said shaft, means including a pump for circulating lubricant under pressure to said sealing means and retarding the flow from said sealing means to surround the sealing means with lubricant under pressure, a conduit interconnecting said evaporator and compressor, pressure regulating means for controlling the withdrawal of refrigerant through said conduit by said compressor for compressing the refrigerant for delivery to said condenser, a by-pass arrangement for withdrawing refrigerant from said evaporator by said compressor without appreciably reducing the pressure in said evaporator during periods said pressure regulating means is closed, and means for admitting a portion of the returning refrigerant into said crankcase to provide with the lubricant circulating under pressure a pressure within said crankcase above atmospheric.

6. Refrigerating apparatus comprising an evaporator and a continuous operating compressor having a crankcase and a chamber, an opening formed through a wall of said crankcase, a crankshaft journaled in said crankcase and extended through said opening, a sealing means for closing said opening about said crankshaft, means including a pump operable by said crankshaft for circulating lubricant under pressure to and retarding the flow of lubricant from said sealing means, a second chamber for separating gaseous refrigerant and lubricant received from said evaporator and retaining the lubricant therein, a conduit for conducting gaseous refrigerant from said second mentioned chamber to said first mentioned chamber, a control means for regulating the flow between said chambers, a by-pass conduit interconnecting said chambers for draining said second mentioned chamber to said first mentioned chamber when said control means closes communication through said first mentioned conduit, and a communicating means between said first mentioned chamber and said crankcase to permit the return of lubricant and refrigerant to said crankcase to maintain an equalized pressure therebetween for the separation of the refrigerant from the lubricant and its return to said chamber, and said pump receiving the lubricant in said crankcase to circulate the same at a pressure above atmospheric.

7. Refrigerating apparatus comprising a condenser, an evaporator and a continuous operating compressor having a crankcase with an opening through a wall of said crankcase, a crankshaft journaled in said crankcase and extending through said opening, a sealing means for closing said opening about said shaft, means including a pump for forcing lubricant under pressure to said sealing means and retarding the flow from said sealing means to surround the sealing means with lubricant under pressure, a tank for separation of lubricant from refrigerant, a conduit interconnecting said evaporator and tank, a second conduit interconnecting said tank and compressor, a pressure regulating means interposed in said second conduit for controlling the withdrawal of refrigerant from said evaporator by said compressor for compressing the refrigerant for delivery to said condenser, a by-pass arrangement around said pressure regulating means comprising a small diameter conduit interconnecting said tank with said compressor for draining the lubricant therefrom to said compressor and the withdrawal of refrigerant therethrough by said compressor when said pressure regulating means is closed, said compressor having means for returning the lubricant to said crankcase and towards said pump, said compressor operable through said means for reducing the pressure within said crankcase, and said pump operable for maintaining the pressure of the lubricant about said seal at above atmospherical pressure.

References Cited in the file of this patent

UNITED STATES PATENTS

| | | |
|---|---|---|
| Re. 23,821 | Davis | May 4, 1956 |
| 580,049 | Heim et al. | Apr. 6, 1897 |
| 2,048,025 | Philipp | July 21, 1936 |
| 2,128,388 | Williams et al. | Aug. 30, 1938 |
| 2,145,354 | Hull | Jan. 31, 1939 |
| 2,418,853 | Shoemaker | Apr. 15, 1947 |
| 2,555,005 | Warneke | May 29, 1951 |
| 2,738,652 | Phillip | Mar. 20, 1956 |
| 2,760,355 | Swart | Aug. 28, 1956 |
| 2,766,593 | Mitchell et al. | Oct. 16, 1956 |